(12) United States Patent
Kawaguchi et al.

(10) Patent No.: US 11,293,750 B2
(45) Date of Patent: Apr. 5, 2022

(54) FILM THICKNESS MEASURING APPARATUS AND FILM THICKNESS MEASURING METHOD

(71) Applicant: Otsuka Electronics Co., Ltd., Osaka (JP)

(72) Inventors: Shiro Kawaguchi, Hirakata (JP); Kazuya Nakajima, Hirakata (JP)

(73) Assignee: Otsuka Electronics Co., Ltd., Osaka (JP)

( * ) Notice: Subject to any disclaimer, the term of this patent is extended or adjusted under 35 U.S.C. 154(b) by 0 days.

(21) Appl. No.: 17/035,519

(22) Filed: Sep. 28, 2020

(65) Prior Publication Data

US 2021/0140758 A1 May 13, 2021

(30) Foreign Application Priority Data

Nov. 11, 2019 (JP) .............................. JP2019-203869

(51) Int. Cl.
*G01B 11/06* (2006.01)
*G01N 21/25* (2006.01)

(52) U.S. Cl.
CPC ........ *G01B 11/0625* (2013.01); *G01N 21/255* (2013.01)

(58) Field of Classification Search
CPC ..................... G01B 11/0625; G01N 21/255
See application file for complete search history.

(56) References Cited

U.S. PATENT DOCUMENTS

| | | | |
|---|---|---|---|
| 6,922,247 B2 | 7/2005 | Inamoto et al. | |
| 2003/0147081 A1 | 8/2003 | Inamoto et al. | |
| 2007/0046953 A1* | 3/2007 | De Groot | G03F 7/70625 356/512 |
| 2012/0320380 A1* | 12/2012 | Schonleber | G01B 11/2441 356/479 |
| 2015/0109611 A1* | 4/2015 | Campagne | G01B 11/06 356/72 |

FOREIGN PATENT DOCUMENTS

| | | | | |
|---|---|---|---|---|
| JP | 2002039955 A | | 2/2002 | |
| JP | 2002048730 A | | 2/2002 | |
| JP | 3453112 B2 | | 10/2003 | |
| JP | 4347504 B2 | | 10/2009 | |
| KR | 20160141042 A | * | 12/2016 | ............. G01B 11/06 |

* cited by examiner

*Primary Examiner* — Jamil Ahmed
(74) *Attorney, Agent, or Firm* — Studebaker & Brackett PC

(57) ABSTRACT

A film thickness measuring apparatus including: a measurement light path for irradiating a measurement target object with light from a light source; a correction light path for irradiating a reference member with light from the light source; and a light switching unit that selectively guides reflected light from the measurement target object or reflected light from the reference member, to a spectroscope.

6 Claims, 11 Drawing Sheets

FILM THICKNESS MEASURING APPARATUS AND FILM THICKNESS MEASURING METHOD

CROSS-REFERENCE TO RELATED APPLICATION

This application is based upon and claims the benefit of priority from Japanese patent application No. 2019-203869, filed on Nov. 11, 2019, the disclosure of which is incorporated herein in its entirety by reference.

BACKGROUND OF THE INVENTION

Field of the Invention

The present invention relates to a film thickness measuring apparatus and a film thickness measuring method.

Description of Related Art

There is a known conventional technique for irradiating a measurement target object and a reference member with light and measuring the film thickness of the measurement target object based on reflected light from the measurement target object and reflected light from the reference member. However, irradiation light with which the measurement target object and the reference member are irradiated, reflected light from the measurement target object, and reflected light from the reference member fluctuates over time due to temporal changes in the light source and temporal changes in the environment. Due to such fluctuations, there is a problem in that it is not possible to obtain an accurate reflectance. To solve such a problem, the techniques according to JP 2002-48730A (Patent Document 1) and JP 2002-39955A (Patent Document 2) are disclosed, for example.

Patent Document 1 discloses an optical automatic measuring method as described below. That is, the optical automatic measuring method is an optical automatic measuring method that employs a light projection unit and a light reception unit provided close to each other, and through which a sample is irradiated with light projected from the light projection unit, and reflected light is measured, wherein a transparent or semitransparent member by which a portion of a light beam projected from the light projection unit is reflected so as to enter the light reception unit is fixed between the sample and the light projection unit and the light reception unit, and the method includes: obtaining the ratio between the amount of reflected light from the member and a measurement amount of light from the reference based on a measurement amount of light when the reference is not present and a measurement amount of light when the reference is placed; estimating a measurement amount of light when the reference is placed during measurement of the sample based on a measurement amount of light when the sample is not present and the ratio; and correcting the measurement amount of light from the sample, using the measurement amount of light thus estimated.

Also, Patent Document 2 discloses an optical automatic measuring method as described below. That is, the optical automatic measuring method is an optical automatic measuring method through which a sample is irradiated with light projected from a light projection unit, and light reflected to a light reception unit is measured, wherein a movable reflection member is provided between a sample setting platform and the light projection unit and the light reception unit so as to be movable, a fixed reflection member is provided on a side of the movable reflection member, the side being opposite to the sample setting platform, and the optical automatic measuring method includes: receiving light from the light projection unit, using the light reception unit, via the movable reflection member, the fixed reflection member, and the movable reflection member in a state where the movable reflection member has been moved to a position below an optical axis; receiving light from light projected from the light projection unit, using the light reception unit, via a reference set on the sample setting platform, in a state where the movable reflection member is displaced from the optical axis; obtaining the ratio between the amounts of light; receiving light projected from the light projection unit, using the light reception unit, via the movable reflection member, the fixed reflection member, and the movable reflection member, during a measurement period for the sample, in a state where the movable reflection member has been moved to a position below the optical axis; estimating an measurement amount of light when the reference is placed, using the amount of light thus received and the ratio; and correcting the amount of light received from the sample, using the measurement amount of light thus estimated.

With the techniques according to Patent Document 1 and Patent Document 2 described above, for example, the tact time is increased due to the process of moving the setting platform for the measurement target object, and also a problem such as contamination or the like of the measurement target object may occur due to a movable mirror being operated above the measurement target object. Therefore, there is a demand for a technique that surpasses the techniques according to Patent Document 1 and Patent Document 2, and makes it possible to measure a film thickness in a shorter period of time, while preventing the measurement target object from being contaminated when measuring the film thickness.

SUMMARY OF THE INVENTION

The present invention has been made to solve the above-described problem, and an object thereof is to provide a film thickness measuring apparatus and a film thickness measuring method that can measure a film thickens in a shorter period of time, while preventing the measurement target object from being contaminated when measuring the film thickness.

(1) To solve the above-described problem, a film thickness measuring apparatus according to one aspect of the invention includes: a measurement light path for irradiating a measurement target object with light from a light source; a correction light path for irradiating a reference member with light from the light source; and a light switching unit that selectively guides reflected light from the measurement target object or reflected light from the reference member, to a spectroscope.

As described above, with the configuration that includes a measurement light path and a correction light path, and also includes a light switching unit that selectively guides reflected light from the measurement target object or reflected light from the reference member, to a spectroscope, it is possible to generate a reception light spectrum of reflected light from the reference member without placing the reference member such as a reflection plate on a sample platform, instead of the measurement target object, before generating a reception light spectrum of reflected light from the measurement target object placed on the sample platform, for example. As a result, for example, by using a reception light spectrum generated in advance by irradiating the reflection plate on the sample platform with light via the measurement light path, a reception light spectrum generated in advance by irradiating the reference member with light via the correction light path, and a reception light spectrum generated by irradiating the reference member with light via the correction light path immediately after irradiating the measurement target object on the sample platform with light via the measurement light path at a certain time, it is possible to estimate the reception light spectrum to be generated, assuming that the reflection plate is placed on the sample platform instead of the measurement target object at the time, and calculate a reflectance spectrum of the measurement target object based on the reception light spectrum thus estimated. Therefore, it is possible to measure the film thickness in a shorter period of time, while preventing a measurement target object from being contaminated when measuring the film thickness.

(2) Preferably, the measurement light path, the correction light path, and the light switching unit are provided in a housing, and the film thickness measuring apparatus further comprises at least one of a light emitting fiber that guides light from the light source provided outside the housing, to the housing, and a light receiving fiber that guides reflected light guided by the light switching unit, which is reflected light from the measurement target object or reflected light from the reference member, to the spectroscope provided outside the housing.

With such a configuration that makes it possible to measure the film thickness at a plurality of positions by easily moving the housing, it is possible to measure the film thickness of the measurement target object at the plurality of positions in a shorter period of time, while preventing the measurement target object from being contaminated when measuring the film thickness.

(3) To solve the above-described problem, A film thickness measuring method according to one aspect of the invention is carried out by using a film thickness measuring apparatus that includes a measurement light path for irradiating a measurement target object with light from a light source, and a correction light path for irradiating a reference member with light from the light source, the film thickness measuring method includes: a step of generating a spectrum of reflected light from the measurement target object by selectively guiding reflected light from the measurement target object irradiated with light that travels to the measurement target object via the measurement light path, to a spectroscope; a step of generating a spectrum of reflected light from the reference member by selectively guiding reflected light from the reference member irradiated with light that travels to the reference member via the correction light path, to the spectroscope; and a step of calculating a thickness of the measurement target object based on the spectrum of the reflected light from the measurement target object and the spectrum of the reflected light from the reference member.

As described above, with the method that is carried out by using a film thickness measuring apparatus that includes a measurement light path and a correction light path, to selectively guide reflected light from a measurement target object and reflected light from a reference member to a spectroscope to generate the respective spectra of reflected light, it is possible to generate a reception light spectrum of reflected light from the reference member without placing the reference member such as a reflection plate on a sample platform, instead of the measurement target object, before generating a reception light spectrum of reflected light from the measurement target object placed on the sample platform, for example. As a result, for example, by using a reception light spectrum generated in advance by irradiating the reflection plate on the sample platform with light via the measurement light path, a reception light spectrum generated in advance by irradiating the reference member with light via the correction light path, and a reception light spectrum generated by irradiating the reference member with light via the correction light path immediately after irradiating the measurement target object on the sample platform with light via the measurement light path at a certain time, it is possible to estimate the reception light spectrum to be generated, assuming that the reflection plate is placed on the sample platform instead of the measurement target object at the time, and calculate a reflectance spectrum of the measurement target object based on the reception light spectrum thus estimated. Therefore, it is possible to measure the film thickness in a shorter period of time, while preventing a measurement target object from being contaminated when measuring the film thickness.

(4) Preferably, the step of generating the spectrum of reflected light from the reference member is regularly or irregularly repeated, in the step of generating the spectrum of reflected light from the reference member, a first reference spectrum that is the spectrum of reflected light from the reference member is generated, and in the step of calculating the thickness of the measurement target object, a reflectance spectrum of the measurement target object is calculated by dividing the spectrum of reflected light from the measurement target object by the first reference spectrum generated immediately before or immediately after the generation of the spectrum of reflected light from the measurement target object, and the thickness of the measurement target object is calculated based on the reflectance spectrum thus calculated.

With such a method, it is possible to measure the film thickness of a measurement target object more accurately, using a simple measuring method.

(5) Preferably, the step of generating the spectrum of reflected light from the reference member is regularly or irregularly repeated, in the step of generating the spectrum of reflected light from the reference member, a first reference spectrum that is the spectrum of reflected light from the reference member is generated, and the film thickness measuring method further includes: a step in which, in a state where a reflection plate is placed on a sample platform, a spectrum of reflected light from the reflection plate is generated by selectively guiding reflected light from the reflection plate irradiated with light that travels to the reflection plate via the measurement light path, to a spectroscope, and a second reference spectrum that is the spectrum of reflected light from the reference member is generated by selectively guiding reflected light from the reference member irradiated with light that travels to the reference member via the correction light path, to the spectroscope, and in the step of calculating the thickness of the measurement target object, a virtual criterion spectrum is calculated by dividing a product of the spectrum of reflected light from the reflection plate and the first reference spectrum generated immediately before or immediately after the generation of the spectrum of reflected light from the measurement target object by the second reference spectrum, a reflectance spectrum of the measurement target object is calculated by dividing the spectrum of reflected light from the measurement target object by the virtual criterion spectrum, and the thickness of the measurement target object is calculated based on the reflectance spectrum thus calculated.

With such a method, it is possible to more accurately estimate a virtual criterion spectrum to be generated in the case where the measurement target object is not placed on the sample platform when a spectrum of reflected light from the measurement target object is to be generated, and more accurately calculate the reflectance spectrum by using the virtual criterion spectrum thus estimated.

(6) Preferably, the measurement light path and the correction light path are provided in a housing, at least one of the spectroscope and the light source is provided outside the housing, and the film thickness measuring method includes: a step that includes the step of generating the spectrum of reflected light from the measurement target object and the step of generating the spectrum of a reflected light from the reference member, and that is a step of calculating the thickness of the measurement target object at a first measurement position by irradiating the first measurement position on the measurement target object with light; and a step that includes the step of generating the spectrum of reflected light from the measurement target object and the step of generating the spectrum of a reflected light from the reference member, and that is a step of calculating the thickness of the measurement target object at a second measurement position that is different from the first measurement position on the measurement target object by irradiating the second measurement position on the measurement target object with light.

With such a method, by using a film thickness measuring apparatus that makes it possible to measure the film thickness at a plurality of positions by easily moving the housing, it is possible to measure the film thickness of the measurement target object at the plurality of positions in a shorter period of time, while preventing the measurement target object from being contaminated when measuring the film thickness.

According to the present invention, it is possible to measure a film thickness in a shorter period of time, while preventing a measurement target object from being contaminated when measuring the film thickness.

The foregoing and other objects, features, aspects and advantages of the present invention will become more apparent from the following detailed description of the present invention when taken in conjunction with the accompanying drawings.

Figure 1:
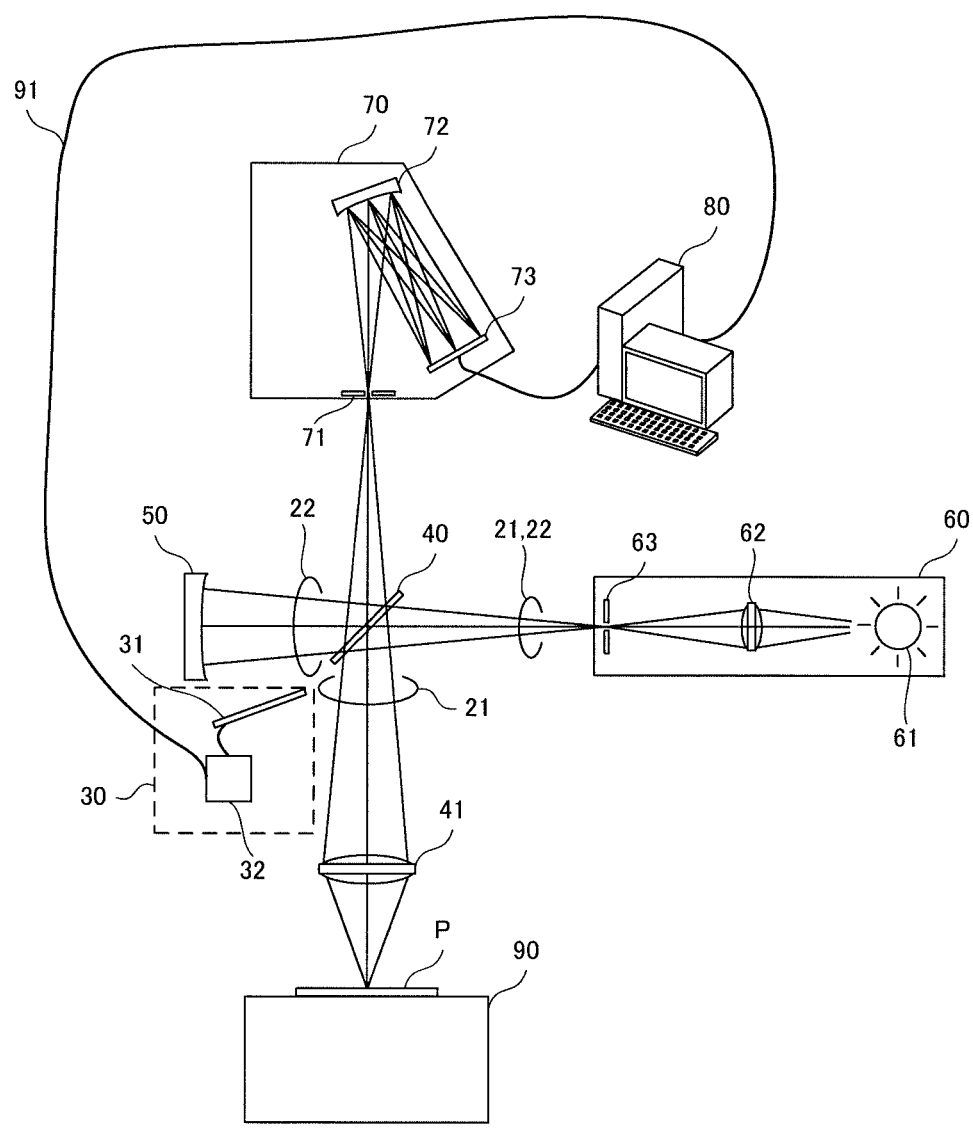
FIG. 1 is a diagram showing an example of a configuration of a film thickness measuring apparatus according to an embodiment of the present invention.

Hereinafter, embodiments of the present invention will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

DETAILED DESCRIPTION OF THE INVENTION

Film Thickness Measuring Apparatus

FIG. 1 is a diagram showing an example of a configuration of a film thickness measuring apparatus according to an embodiment of the present invention.

As shown in FIG. 1, a film thickness measuring apparatus 100 includes a measurement light path 21, a correction light path 22, and a light switching unit 30.

For example, the film thickness measuring apparatus 100 also includes a beam splitter 40, a light condensing lens 41, a reference member 50, a light source 60, a spectroscope 70, a processing device 80, and a sample platform 90.

A target object P is to be placed on the sample platform 90. More specifically, a measurement target object S or a reflection plate R is to be placed on the sample platform 90 as the target object P. The reflection plate R may be an aluminum mirror, a glass plate, or an Si plate, for example. The film thickness measuring apparatus 100 is an apparatus for measuring the film thickness of the measurement target object S based on reflected light from the measurement target object S placed on the sample platform 90 irradiated with light.

The beam splitter 40 reflects a portion of a light beam output from the light source 60, and allows another portion to pass therethrough. The light reflected from the beam splitter 40 travels to the target object P placed on the sample platform 90. The light passing through the beam splitter 40 travels to the reference member 50.

The condensing lens 41 condenses the light reflected from the beam splitter 40, and irradiates the target object P placed on the sample platform 90 with the condensed light.

The reference member 50 is, for example, an aluminum mirror that has a depressed surface. Note that the reference member 50 may be a glass plate or an Si plate.

Measurement Light Path

The measurement light path 21 is a light path that is used to irradiate the target object P such as the measurement target object S with light from the light source 60.

More specifically, the measurement light path 21 is a light path from the light source 60 to the target object P. The measurement light path 21 includes a light path from the light source 60 to the beam splitter 40 and a light path from the beam splitter 40 to the target object P.

Correction Light Path

The correction light path 22 is a light path that is used to irradiate a reference member 50 with light from the light source 60.

More specifically, the correction light path 22 is a light path from the light source 60 to the reference member 50. The correction light path 22 includes a light path from the light source 60 to the beam splitter 40 and a light path from the beam splitter 40 to the reference member 50.

Light Source

The light source 60 outputs light that is used to measure the film thickness of the measurement target object S, to the measurement light path 21 and the correction light path 22.

For example, the light source 60 includes an illumination apparatus 61, a light condensing lens 62, and an aperture 63.

The illumination apparatus 61 emits light that includes a plurality of wavelengths. The spectrum of the light emitted from the illumination apparatus 61 may be a continuous spectrum or a line spectrum. The wavelengths of light emitted from the illumination apparatus 61 are set according to, for example, the range of wavelength information to be acquired from the measurement target object S. The illumination apparatus 61 is a halogen lamp, for example.

The light condensing lens 62 condenses light emitted from the illumination apparatus 61, and outputs the condensed light to the aperture 63.

The aperture 63 shapes the cross section of a light beam that has entered the aperture 63 into a predetermined shape, and guides the light beam to the measurement light path 21 and the correction light path 22.

Spectroscope

The spectroscope 70 receives reflected light from the target object P irradiated with light that travels to the target object P via the measurement light path 21, and reflected light from the reference member 50 irradiated with light that travels to the reference member 50 via the correction light path 22.

More specifically, reflected light from the target object P enters the spectroscope 70 via the condensing lens 41 and the beam splitter 40. Reflected light from the reference member 50 is reflected by the beam splitter 40 and enters the spectroscope 70.

For example, the spectroscope 70 includes an aperture 71, a diffraction grating 72, and an imaging unit 73.

The aperture 71 shapes the cross section of a reflected light beam from the target object P and a reflected light beam from the reference member 50 into a predetermined shape, and guides the light beams to the diffraction grating 72.

The diffraction grating 72 disperses light that enters the diffraction grating 72 via the aperture 71, i.e. reflected light from the target object P and reflected light from the reference member 50, and outputs the dispersed light to the imaging unit 73.

For example, the imaging unit 73 is a linear image sensor constituted by a plurality of imaging devices arranged in a straight line. Such imaging devices are CCD (Charge Coupled Device) image sensors or CMOS (Complementary Metal Oxide Semiconductor) image sensors, for example.

Each imaging device in the imaging unit 73 receives the light dispersed by the diffraction grating 72.

The imaging unit 73 transmits, to the processing device 80, reception light intensity information that indicates the intensity of light received by the light reception surfaces of the imaging devices.

Light Switching Unit

The light switching unit 30 selectively guides reflected light from the target object P such as the measurement target object S, or reflected light from the reference member 50, to the spectroscope 70.

More specifically, the light switching unit 30 switches between a state in which reflected light from the target object P enters the spectroscope 70 and a state in which reflected light from the reference member 50 enters the spectroscope 70.

For example, the light switching unit 30 includes a shutter 31 and a shutter controller 32. The shutter controller 32 is connected to the processing device 80 via a cable 91.

That shutter 31 is movable and can be provided in the measurement light path 21 or the correction light path 22. Specifically, the shutter 31 is selectively placed between the beam splitter 40 and the condensing lens 41 in the measurement light path 21, or between the beam splitter 40 and the reference member 50 in the correction light path 22.

In the state of being provided in the measurement light path 21, the shutter 31 blocks the light passing through the measurement light path 21. In the state of being provided in the correction light path 22, the shutter 31 blocks the light passing through the correction light path 22.

The shutter controller 32 changes the position of the shutter 31 by controlling the shutter 31. More specifically, the shutter controller 32 receives, from the processing device 80 via the cable 91, a control signal that is used to select reflected light that is to be guided to the spectroscope 70, from reflected light from the target object P and reflected light from the reference member 50, and switches the position where the shutter 31 is to be placed, between the measurement light path 21 and the correction light path 22, according to the received control signal.

Figure 2:
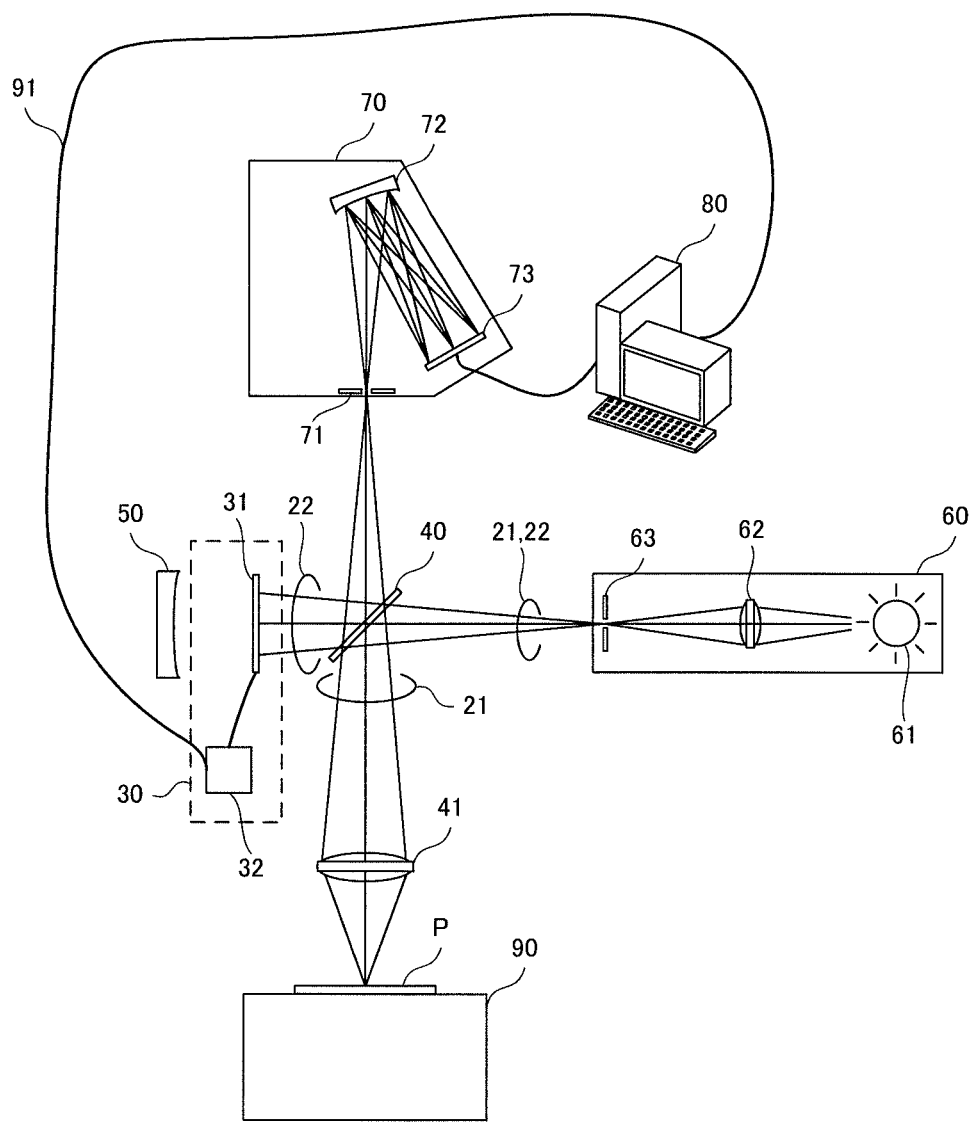
FIG. 2 is a diagram showing a state in which the shutter is provided in the correction light path in the film thickness measuring apparatus according to the embodiment of the present invention.

FIG. 2 is a diagram showing a state in which the shutter is provided in the correction light path in the film thickness measuring apparatus according to the embodiment of the present invention.

As shown in FIG. 2, the shutter 31 provided in the correction light path 22 blocks the light passing through the beam splitter 40, of the light output from the light source 60. In other words, in a state where the shutter 31 is provided in the correction light path 22, the light passing through the beam splitter 40, of the light output from the light source 60, is blocked by the shutter 31.

On the other hand, the light reflected by the beam splitter 40, of the light output from the light source 60, travels to the target object P via the condensing lens 41.

Reflected light travelling from the target object P as a result of the target object P being irradiated with light enters the spectroscope 70 via the condensing lens 41 and the beam splitter 40.

Figure 3:
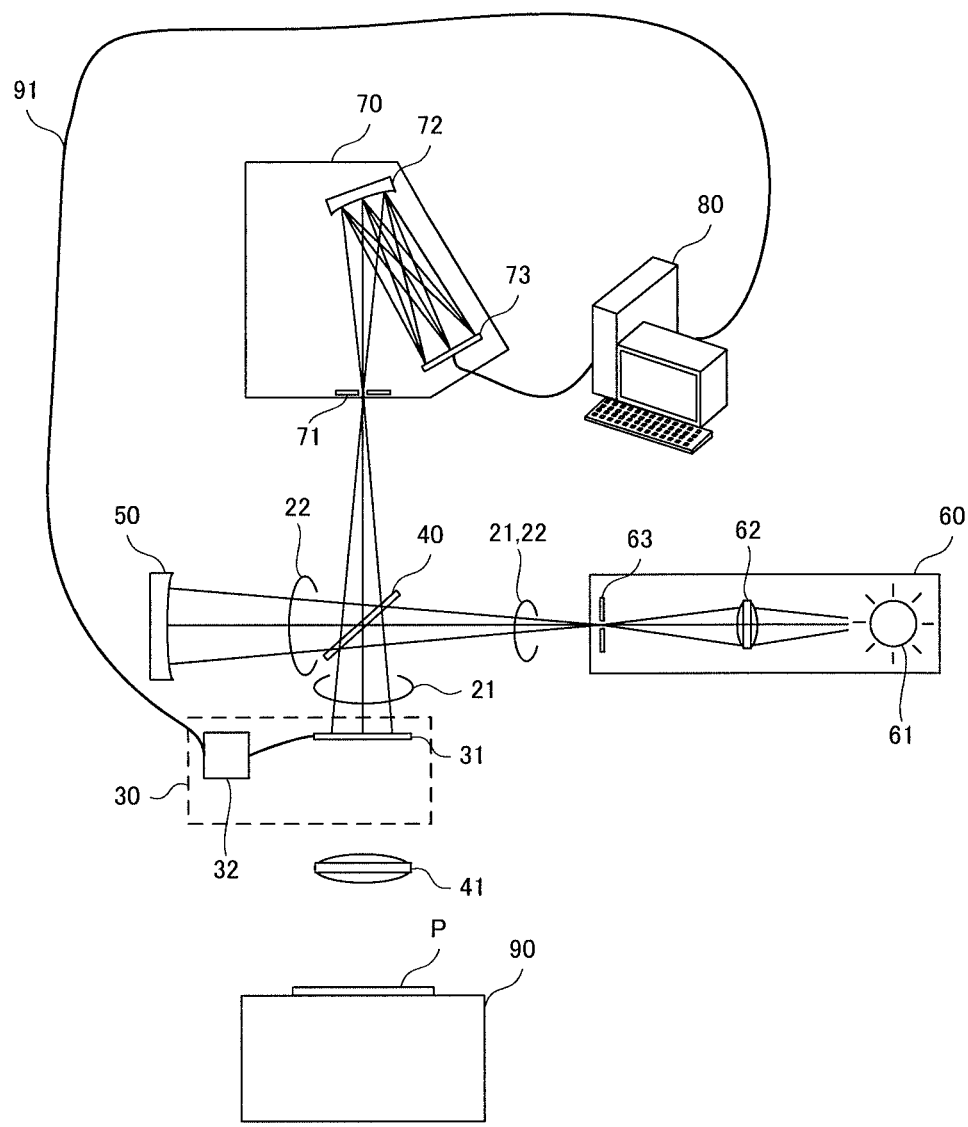
FIG. 3 is a diagram showing a state in which the shutter is provided in the measurement light path in the film thickness measuring apparatus according to the embodiment of the present invention.

FIG. 3 is a diagram showing a state in which the shutter is provided in the measurement light path in the film thickness measuring apparatus according to the embodiment of the present invention.

As shown in FIG. 3, the shutter 31 provided in the measurement light path 21 blocks the light reflected by the beam splitter 40, of the light output from the light source 60. In other words, in a state where the shutter 31 is provided in the measurement light path 21, the light reflected by the beam splitter 40, of the light output from the light source 60, is blocked by the shutter 31.

On the other hand, the light passing through the beam splitter 40, of the light output from the light source 60, travels to the reference member 50.

The reflected light travelling from the reference member 50 as a result of the reference member 50 being irradiated with light is reflected by the beam splitter 40 and enters the spectroscope 70.

As described with reference to FIGS. 2 and 3, the light switching unit 30 selectively blocks the light travelling from the light source 60 to the target object P or the light travelling from the light source 60 to the reference member 50. Specifically, the light switching unit 30 switches between a state in which the target object P is irradiated with the light from the light source 60 and a state in which the reference member 50 is irradiated with the light from the light source 60, by changing the position at which the shutter 31 is provided. Thus, the light switching unit 30 switches between a state in which reflected light from the target object P enters the spectroscope 70 and a state in which reflected light from the reference member 50 enters the spectroscope 70.

Processing Device

Figure 4:
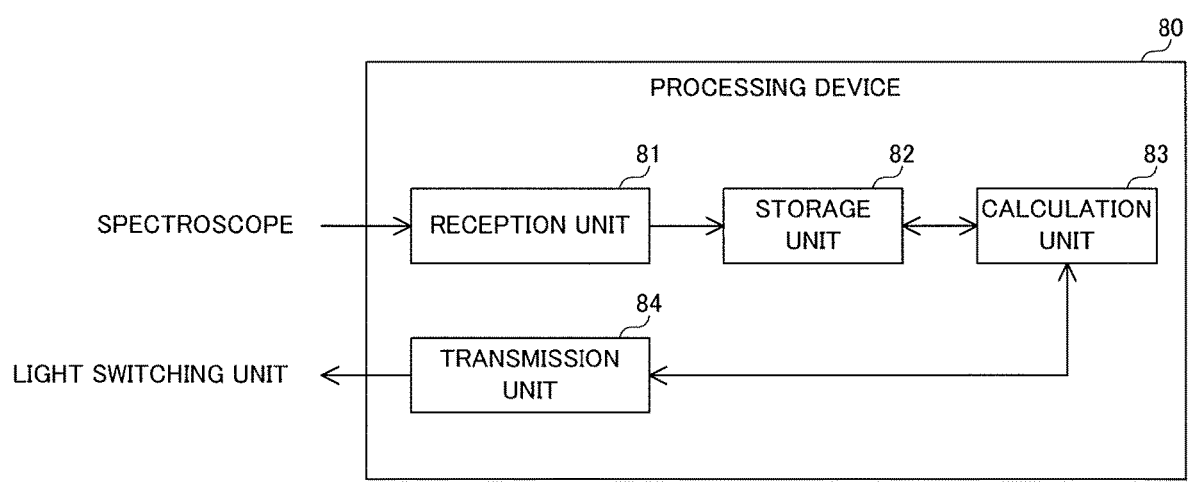
FIG. 4 is a diagram showing a configuration of the processing device included in the film thickness measuring apparatus according to the embodiment of the present invention.

FIG. 4 is a diagram showing a configuration of the processing device included in the film thickness measuring apparatus according to the embodiment of the present invention.

As shown in FIG. 4, the processing device 80 includes a reception unit 81, a storage unit 82, a calculation unit 83, and a transmission unit 84. The reception unit 81, the calculation unit 83, and the transmission unit 84 are, for example, realized by a processor such as CPU (Central Processing Unit) or DSP (Digital Signal Processor). The storage unit 82 is, for example, a non-volatile memory. The processing device 80 calculates the film thickness of the measurement target object S based on the result of measurement of the reflected light from the spectroscope 70.

The calculation unit 83 generates a control signal for controlling the position of the shutter 31 in the light switching unit 30, and outputs the generated control signal to the transmission unit 84.

Upon receiving the control signal from the calculation unit 83, the transmission unit 84 transmits the received control signal to the shutter controller 32 in the light switching unit 30.

The reception unit 81 receives reception light intensity information from the imaging unit 73 in the spectroscope 70, and stores the received reception light intensity information in the storage unit 82.

The calculation unit 83 generates a reception light spectrum $S(\lambda,t)$ that indicates a relationship between the wavelenght $\lambda$ and the intensity of the light received by the spectroscope 70 during a period from a time t to a time (t+T) when a predetermined exposure time T has elapsed, based on the reception light intensity information in the storage unit 82. Hereinafter, "the reception light spectrum $S(\lambda,t)$ of light received by the spectroscope 70 during the period from the time t to the time (t+T)" may also be referred to as "the reception light spectrum $S(\lambda,t)$ of light received by the spectroscope 70 at the time t" or "the reception light spectrum $S(\lambda,t)$ at the time t".

The calculation unit 83 calculates the film thickness of the measurement target object S based on the reception light spectrum $S(\lambda,t)$ thus generated.

More specifically, the calculation unit 83 calculates the reflectance spectrum of the measurement target object S based on a criterion spectrum $Ss(\lambda,t)$ that is a reception light spectrum that is based on reflected light from the reflection plate R placed on the sample platform 90, a reference spectrum $Sr(\lambda,t)$ that is a reception light spectrum that is based on reflected light from the reference member 50, and a measurement spectrum $Sm(\lambda,t)$ that is a reception light spectrum that is based on reflected light from the measurement target object S placed on the sample platform 90. The criterion spectrum $Ss(\lambda,t)$ is an example of a spectrum of reflected light from the reflection plate R. The measurement spectrum $Sm(\lambda,t)$ is an example of a spectrum of reflected light from the measurement target object S. The reference spectrum $Sr(\lambda,t)$ is an example of a spectrum of reflected light from the reference member 50.

Generation of Criterion Spectrum

For example, in a state where the reflection plate R is placed on the sample platform 90, the calculation unit 83 generates a criterion spectrum $Ss(\lambda,ta0)$ that is based on the reflected light from the reflection plate R received by the spectroscope 70 at a time ta0. Furthermore, the calculation unit 83 generates a reference spectrum $Sr(\lambda,ta1)$ that is based on the reflected light from the reference member 50 received by the spectroscope 70 at a time ta1 that is later than the time ta0. Note that the time ta1 may be earlier than the time ta0. The reference spectrum $Sr(\lambda,ta1)$ is an example of a second reference spectrum.

Specifically, the calculation unit 83 transmits a control signal to the light switching unit 30 via the transmission unit 84 so that the reflected light from the reflection plate R placed on the sample platform 90 enters the spectroscope 70, and thus generates the criterion spectrum $Ss(\lambda,ta0)$.

Thereafter, the calculation unit 83 transmits a control signal to the light switching unit 30 via the transmission unit 84 so that the reflected light from the reference member 50 enters the spectroscope 70, and thus generates the reference spectrum $Sr(\lambda,ta1)$.

For example, the calculation unit 83 generates the criterion spectrum $Ss(\lambda,ta0)$ and the reference spectrum $Sr(\lambda,ta1)$ at substantially the same time.

More specifically, the time difference between the time ta0 and the time ta1 is preferably close to the exposure time T. For example, the time difference between the time ta0 and the time ta1 is equal to the exposure time T. Specifically, for example, at a time (ta0+T) when the exposure time T has elapsed since the time ta0, the calculation unit 83 transmits a control signal to the light switching unit 30 via the transmission unit 84 so that the reflected light from the reference member 50 enters the spectroscope 70, and thus generates the reference spectrum $Sr(\lambda,ta1)$ at the time ta1 that is substantially the same as the time (ta0+T).

The calculation unit 83 stores the criterion spectrum $Ss(\lambda,ta0)$ and the reference spectrum $Sr(\lambda,ta1)$ thus generated, in the storage unit 82.

Generation of Measurement Spectrum

Thereafter, in a state where the measurement target object S is placed on the sample platform 90, the calculation unit 83 generates a measurement spectrum $Sm(\lambda,tb0)$ that is based on the reflected light from the measurement target object S received by the spectroscope 70 at a time tb0. Furthermore, the calculation unit 83 generates the reference spectrum $Sr(\lambda,tb1)$ that is based on the reflected light from the reference member 50 received by the spectroscope 70 at a time tb1 that is later than the time tb0, every time the calculation unit 83 generates the measurement spectrum $Sm(\lambda,tb0)$. Note that the time tb1 may be earlier than the time tb0. The reference spectrum $Sr(\lambda,tb1)$ is an example of a first reference spectrum.

Specifically, the calculation unit 83 transmits a control signal to the light switching unit 30 via the transmission unit 84 so that the reflected light from the measurement target object S placed on the sample platform 90 enters the spectroscope 70, and thus generates the measurement spectrum Sm($\lambda$,tb0).

Thereafter, the calculation unit 83 transmits a control signal to the light switching unit 30 via the transmission unit 84 so that the reflected light from the reference member 50 enters the spectroscope 70, and thus generates the reference spectrum Sr($\lambda$,tb1).

For example, the calculation unit 83 generates the measurement spectrum Sm($\lambda$,tb0) and the reference spectrum Sr($\lambda$,tb1) at substantially the same time.

More specifically, the time difference between the time tb0 and the time tb1 is preferably close to the exposure time T. For example, the time difference between the time tb0 and the time tb1 is equal to the exposure time T. Specifically, for example, at a time (tb0+T) when the exposure time T has elapsed since the time tb0, the calculation unit 83 transmits a control signal to the light switching unit 30 via the transmission unit 84 so that the reflected light from the reference member 50 enters the spectroscope 70, and thus generates the reference spectrum Sr($\lambda$,tb1) at the time tb1 that is substantially the same as the time (tb0+T).

Generation of Reflectance Spectrum

Upon generating the measurement spectrum Sm($\lambda$,tb0) and the reference spectrum Sr($\lambda$,tb1), the calculation unit 83 references the criterion spectrum Ss($\lambda$,ta0) and the reference spectrum Sr($\lambda$,ta1) in the storage unit 82, and calculates a virtual criterion spectrum Ssv($\lambda$,tb0) as expressed by the formula (1) shown below. Thereafter, using the virtual criterion spectrum Ssv($\lambda$,tb0) thus calculated, the calculation unit 83 calculates a reflectance spectrum SR($\lambda$,tb0) of the measurement target object S according to the formula (2) shown below.

[Math. 1]

$$Ssv(\lambda, tb0) = \frac{Ss(\lambda, ta0) \times Sr(\lambda, tb1)}{Sr(\lambda, ta1)} \quad (1)$$

[Math. 2]

$$SR(\lambda, tb0) = \frac{Sm(\lambda, tb0)}{Ssv(\lambda, tb0)} \quad (2)$$

In other words, the calculation unit 83 calculates the virtual criterion spectrum Ssv($\lambda$,tb0) by dividing the product of the criterion spectrum Ss($\lambda$,ta0) and the reference spectrum Sr($\lambda$,tb1) generated immediately before or immediately after the generation of the measurement spectrum Sm($\lambda$, tb0), by the reference spectrum Sr($\lambda$,ta1). Thereafter, the calculation unit 83 calculates the reflectance spectrum SR($\lambda$, tb0) of the measurement target object S by dividing the measurement spectrum Sm($\lambda$,tb0) by the virtual criterion spectrum Ssv($\lambda$,tb0). Thereafter, the calculation unit 83 calculates the thickness of the measurement target object S based on the reflectance spectrum SR($\lambda$,tb0) thus calculated. Note that the time when the reference spectrum Sr($\lambda$,tb1) is generated is, for example, the time that is closest to the time when the measurement spectrum Sm($\lambda$,tb0) is generated.

Note that the calculation unit 83 may be configured to generate the reception light spectra such as the criterion spectrum Ss($\lambda$,ta0), the reference spectrum Sr($\lambda$,ta1), the measurement spectrum Sm($\lambda$,tb0), and the reference spectrum Sr($\lambda$,tb1) respectively based on pieces of reception light intensity information generated in the spectroscope 70 during different exposure times T. If this is the case, the calculation unit 83 converts the values of the reception light intensities respectively indicated by the pieces of reception light intensity information, to the value of a reception light intensity generated during the same exposure time T, and generates each reception light spectrum based on the converted value.

Also, although the calculation unit 83 has been described as being configured to generate the reference spectrum Sr($\lambda$,tb1) every time the calculation unit 83 generates the measurement spectrum Sm($\lambda$,tb0), the calculation unit 83 is not limited to such a configuration. The calculation unit 83 may be configured to regularly or irregularly generate the reference spectrum Sr($\lambda$,tb1) regardless of the time when the calculation unit 83 generates the measurement spectrum Sm($\lambda$,tb0).

Figure 5:
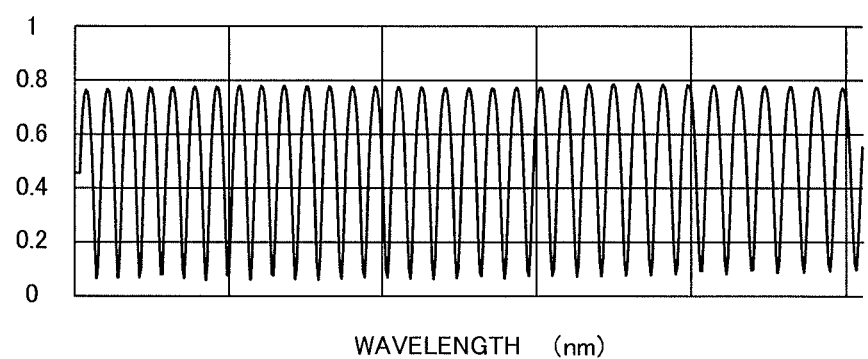
FIG. 5 is a diagram showing the reflectance spectrum of the measurement target object, generated by the film thickness measuring apparatus according to the embodiment of the present invention.

FIG. 5 is a diagram showing the reflectance spectrum of the measurement target object, generated by the film thickness measuring apparatus according to the embodiment of the present invention. In FIG. 5, the horizontal axis indicates the wavelength (nm) and the vertical axis indicates the reflectance.

Although the calculation unit 83 has been described as being configured to calculate the reflectance spectrum SR($\lambda$, tb0) according to the above formula (2), the calculation unit 83 is not limited to such a configuration. The calculation unit 83 may calculate the reflectance spectrum SR($\lambda$,tb0) of the measurement target object S according to the formula (3) shown below.

[Math. 3]

$$SR(\lambda, tb0) = \frac{Sm(\lambda, tb0)}{Sr(\lambda, tb1)} \quad (3)$$

In other words, the calculation unit 83 calculates the reflectance spectrum SR($\lambda$,tb0) of the measurement target object S by dividing the measurement spectrum Sm($\lambda$,tb0) by the reference spectrum Sr($\lambda$,tb1). Thereafter, the calculation unit 83 calculates the thickness of the measurement target object S based on the reflectance spectrum SR($\lambda$,tb0) thus calculated.

Calculation of Film Thickness

The calculation unit 83 calculates the film thickness of the measurement target object S based on the reflectance spectrum SR($\lambda$,tb0) thus calculated.

For example, the calculation unit 83 calculates the film thickness of the measurement target object S by analyzing the reflectance spectrum SR($\lambda$,tb0) according to the FFT (Fast Fourier Transform) method.

More specifically, the calculation unit 83 generates the power spectrum of the reflectance spectrum SR($\lambda$,tb0) by performing FFT processing on the reflectance spectrum SR($\lambda$,tb0).

Figure 6:
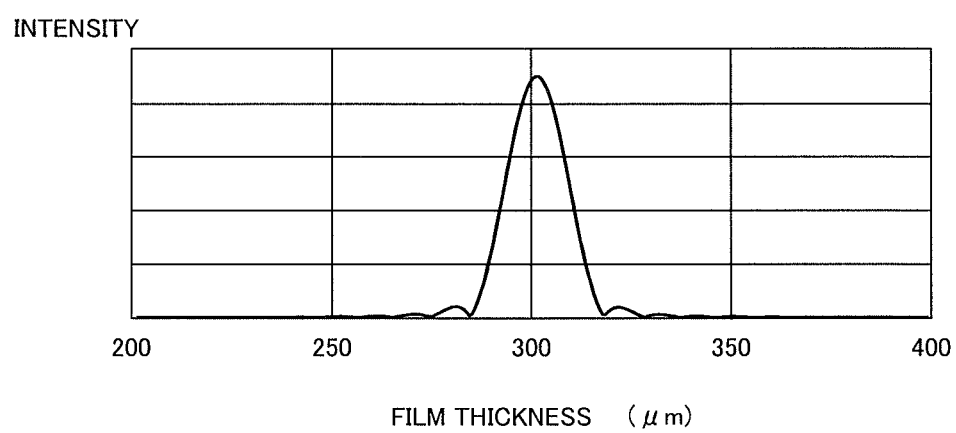
FIG. 6 is a diagram showing the power spectrum of the reflectance spectrum of the measurement target object, generated by the film thickness measuring apparatus according to the embodiment of the present invention.

FIG. 6 is a diagram showing the power spectrum of the reflectance spectrum of the measurement target object, generated by the film thickness measuring apparatus according to the embodiment of the present invention. In FIG. 6, the horizontal axis indicates the film thickness ($\mu$m) and the vertical axis indicates the intensity.

As shown in FIG. 6, the calculation unit 83 specifies the film thickness at which the intensity in the generated power spectrum has the maximum value, as the film thickness of the measurement target object S.

Evaluation

In the film thickness measuring apparatus 100, the intensity of light output from the light source 60 and the light reception sensitivity of the spectroscope 70 may fluctuate over time. Therefore, variations in the measurement value when the film thickness of the measurement target object S was repeatedly measured at predetermined time intervals using the film thickness measuring apparatus according to the embodiment of the present invention were evaluated through the following procedures.

First, the reflection plate R was placed on a sample platform 90A, and the criterion spectrum Ss(λ,ta0) and the reference spectrum Sr(λ,ta1) were generated in advance.

Next, a sample platform 90B on which the measurement target object S was placed was prepared, the position of the sample platform 90A and the position of the sample platform 90B were exchanged with each other, and the measurement spectrum Sm(λ,tb0) and the reference spectrum Sr(λ,tb1) were generated at the time tb0 that is later than the time ta0 by one hour. After the measurement spectrum Sm(λ,tb0) and the reference spectrum Sr(λ,tb1) were generated, the position of the sample platform 90A and the position of the sample platform 90B were exchanged with each other and a criterion spectrum Ss(λ,tb2) at a time tb2 was generated as soon as possible.

Through the same procedures, the measurement spectrum Sm(λ,tb0), the reference spectrum Sr(λ,tb1), and the criterion spectrum Ss(λ,tb2) were repeatedly generated every one hour, twelve times in total.

Next, based on the spectra generated every one hour, the reflectance spectrum SR(λ,tb0) was calculated for each hour, and the film thickness of the measurement target object S was calculated based on each reflectance spectrum SR(λ,tb0) thus calculated.

Figure 7:
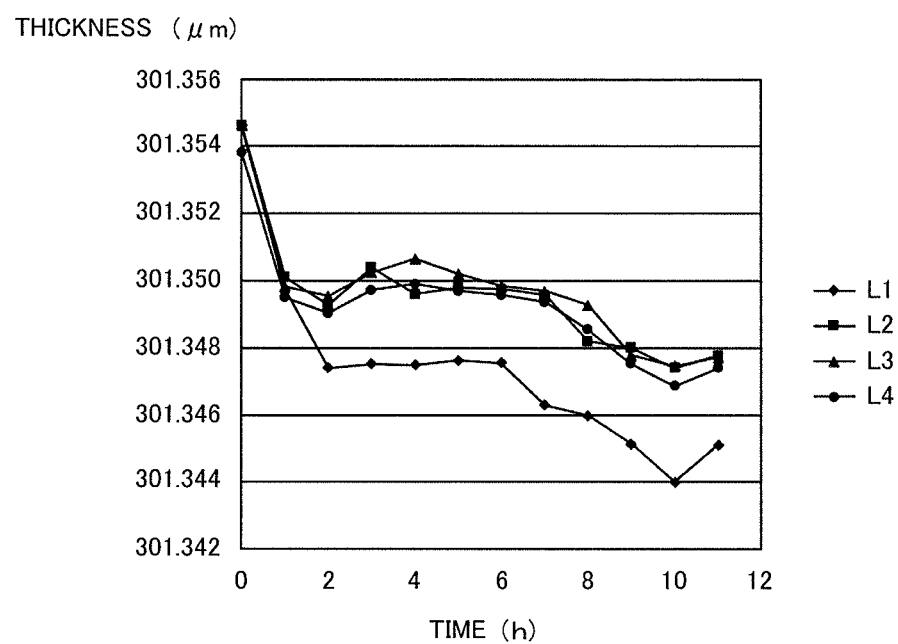
FIG. 7 is a diagram showing changes over time in the measurement value of the film thickness of the measurement target object, calculated by the film thickness measuring apparatus according to the embodiment of the present invention.

FIG. 7 is a diagram showing changes over time in the measurement value of the film thickness of the measurement target object, calculated by the film thickness measuring apparatus according to the embodiment of the present invention. In FIG. 7, the horizontal axis indicates the time (h) and the vertical axis indicates the thickness (μm).

In FIG. 7, a series L1 is a comparative example, and indicates the measurement value of the film thickness of the measurement target object S based on the reflectance spectrum SR(λ,tb0) calculated according to the formula (4) shown below, using the criterion spectrum Ss(λ,ta0) generated in advance and the measurement spectrum Sm(λ,tb0) generated every one hour.

[Math. 4]

$$SR(\lambda, tb0) = \frac{Sm(\lambda, tb0)}{Ss(\lambda, ta0)} \quad (4)$$

A series L2 is a reference example, and indicates the measurement value of the film thickness of the measurement target object S based on the reflectance spectrum SR(λ,tb0) calculated according to the formula (5) shown below, using the measurement spectrum Sm(λ,tb0) generated every one hour and the criterion spectrum Ss(λ,tb2) generated every one hour. In other words, the reference example indicates a measurement value that is calculated using the measurement spectrum Sm(λ,tb0) and the criterion spectrum Ss(λ,tb2) actually generated at substantially the same time as the measurement spectrum Sm(λ,tb0).

[Math. 5]

$$SR(\lambda, tb0) = \frac{Sm(\lambda, tb0)}{Ss(\lambda, tb2)} \quad (5)$$

A series L3 indicates the measurement value of the film thickness of the measurement target object S based on the reflectance spectrum SR(λ,tb0) calculated for each hour according to the formula (2) described above, using the film thickness measuring method according to the embodiment of the present invention.

A series L4 indicates the measurement value of the film thickness of the measurement target object S based on the reflectance spectrum SR(λ,tb0) calculated for each hour according to the formula (3) described above, using the film thickness measuring method according to the embodiment of the present invention.

As shown in FIG. 7, the trend of changes over time in the measurement value in the comparative example (the series L1) is different from the trend of changes over time in the measurement value of the film thickness calculated using the film thickness measuring method according to the embodiment of the present invention (the series L3 and L4) and the trend of changes over time in the measurement value in the reference example (the series L2).

More specifically, the measurement value of the film thickness calculated using the film thickness measuring method according to the embodiment of the present invention is similar to the measurement value in the reference example in which the film thickness measuring method that uses the actually measured criterion spectrum Ss(λ,tb2) is employed, and exhibits smaller changes over time than the measurement value in the comparative example.

Another Example of Configuration of Film Thickness Measuring Apparatus

Figure 8:
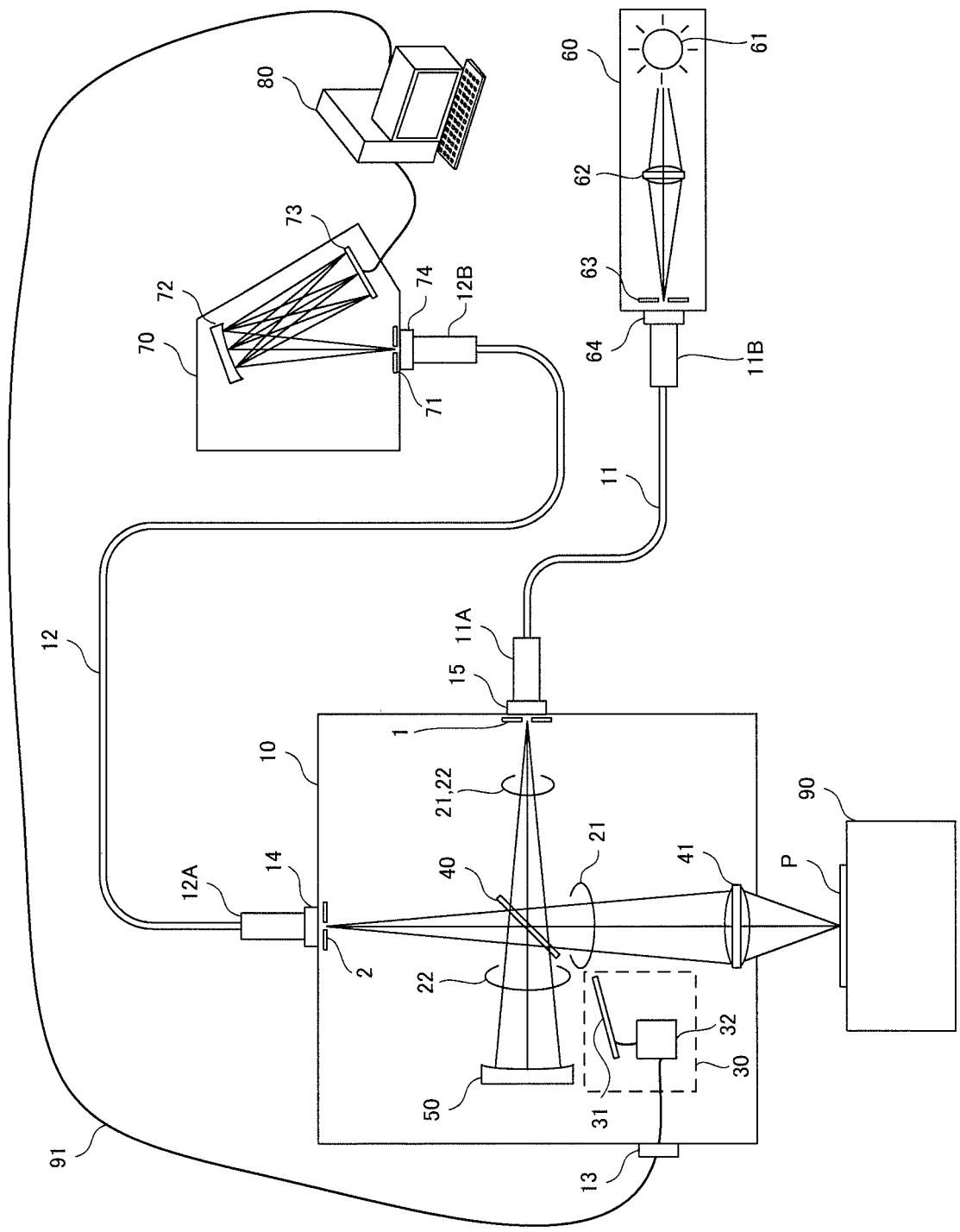
FIG. 8 is a diagram showing another example of a configuration of the film thickness measuring apparatus according to an embodiment of the present invention.

FIG. 8 is a diagram showing another example of a configuration of the film thickness measuring apparatus according to an embodiment of the present invention.

As shown in FIG. 8, a film thickness measuring apparatus 101 includes the light source 60, the spectroscope 70, the processing device 80, the sample platform 90, a probe 10, a light emitting fiber 11, and a light receiving fiber 12.

The measurement light path 21, the correction light path 22, the light switching unit 30, the beam splitter 40, the condensing lens 41, and the reference member 50 are provided inside the probe 10. The light source 60, the spectroscope 70, and the processing device 80 are provided outside the probe 10. The probe 10 is an example of a housing.

The probe 10 includes a connector 13, a connector 14, a connector 15, an aperture 1, and an aperture 2. The light emitting fiber 11 can be connected to the connector 15. The light receiving fiber 12 can be connected to the connector 14. The cable 91 can be connected to the connector 13.

The measurement light path 21 includes a light path from the aperture 1 to the beam splitter 40 and a portion inside the probe 10, of a light path from the beam splitter 40 to the target object P via the condensing lens 41. The correction light path 22 includes a light path from the aperture 1 to the beam splitter 40 and a light path from the beam splitter 40 to the reference member 50.

The light emitting fiber 11 guides light from the light source 60 to the probe 10. More specifically, a connector 11A at a first end of the light emitting fiber 11 is connected to the connector 15 of the probe 10. A connector 11B at a second end of the light emitting fiber 11 is connected to a connector 64 of the light source 60.

The light source 60 outputs light that is used to measure the film thickness of the measurement target object S, to the aperture 1 via the light emitting fiber 11.

The light receiving fiber 12 guides the reflected light from the target object P and the reflected light from the reference member 50 to the spectroscope 70. More specifically, a connector 12A at a first end of the light receiving fiber 12 is connected to the connector 14 of the probe 10. A connector 12B at a second end of the light receiving fiber 12 is connected to a connector 74 of the spectroscope 70.

The spectroscope 70 receives the reflected light from the target object P irradiated with light that travels to the target object P via the measurement light path 21, and the reflected light from the reference member 50 irradiated with light that travels to the reference member 50 via the correction light path 22, via the aperture 2 and the light receiving fiber 12.

For example, the light emitting fiber 11 and the light receiving fiber 12 are flexible. Therefore, when the positions of the light source 60 and the spectroscope 70 are fixed, the probe 10 is movable within a certain range.

The connector 13 is an example of an interface member for providing the probe 10 with a control signal from an external device. The control signal is used to select the reflected light to be guided to the spectroscope 70, from the reflected light from the target object P and the reflected light from the reference member 50. The cable 91 is connected to the connector 13 of the probe 10. The connector 13 is connected to the shutter controller 32 via internal wiring.

The shutter controller 32 receives a control signal from the processing device 80 via the cable 91 and the connector 13, and switches the position at which the shutter 31 is to be placed, to the position in the measurement light path 21 and the position in the correction light path 22, according to the received control signal. With such a configuration, it is easy to cause the film thickness measuring apparatus 101 to switch the reflected light to be guided to the spectroscope 70, from a device outside the probe 10.

For example, the processing device 80 transmits a control signal to a drive device (not shown) according to a user operation, thereby moving the probe 10 using the drive device.

Figure 9:
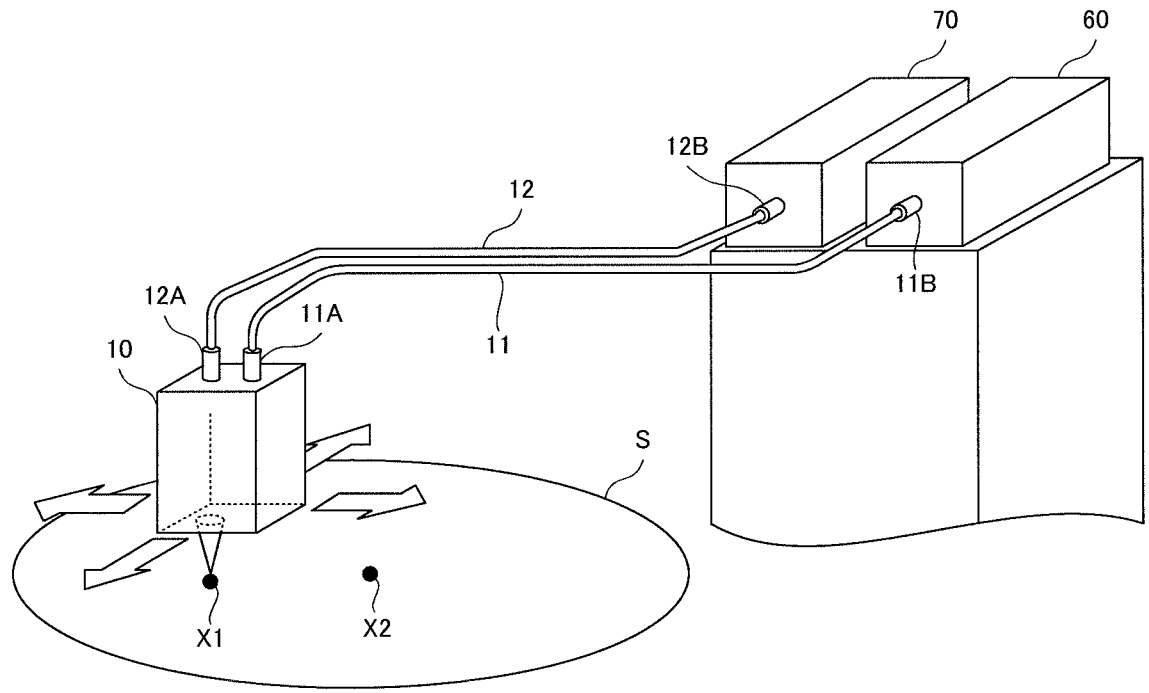
FIG. 9 is a diagram showing a use example of the film thickness measuring apparatus according to the embodiment of the present invention.

FIG. 9 is a diagram showing a use example of the film thickness measuring apparatus according to the embodiment of the present invention.

As shown in FIG. 9, for example, the user of the film thickness measuring apparatus 101 operates the processing device 80 to move the probe 10 to a position above a measurement position X1 (a first measurement position) on the measurement target object S, and operates the processing device 80 to emit light to the measurement position X1 to calculate the thickness of the measurement target object S at the measurement position X1. And thereafter the user operates the processing device 80 to move the probe 10 to a position above a measurement position X2 (a second measurement position) on the measurement target object S, and operates the processing device 80 to emit light to the measurement position X2 to calculate the thickness of the measurement target object S at the measurement position X2.

Operation Flow

The film thickness measuring apparatus according to the embodiment of the present invention is provided with a computer that includes a memory, and a calculation unit such as a CPU of the computer reads out a program that includes some or all of the steps of the following flowchart and sequence from the memory, and executes the program. The program for this apparatus can be installed from the outside. The program for this apparatus is distributed in a state of being stored in a recording medium.

Figure 10:
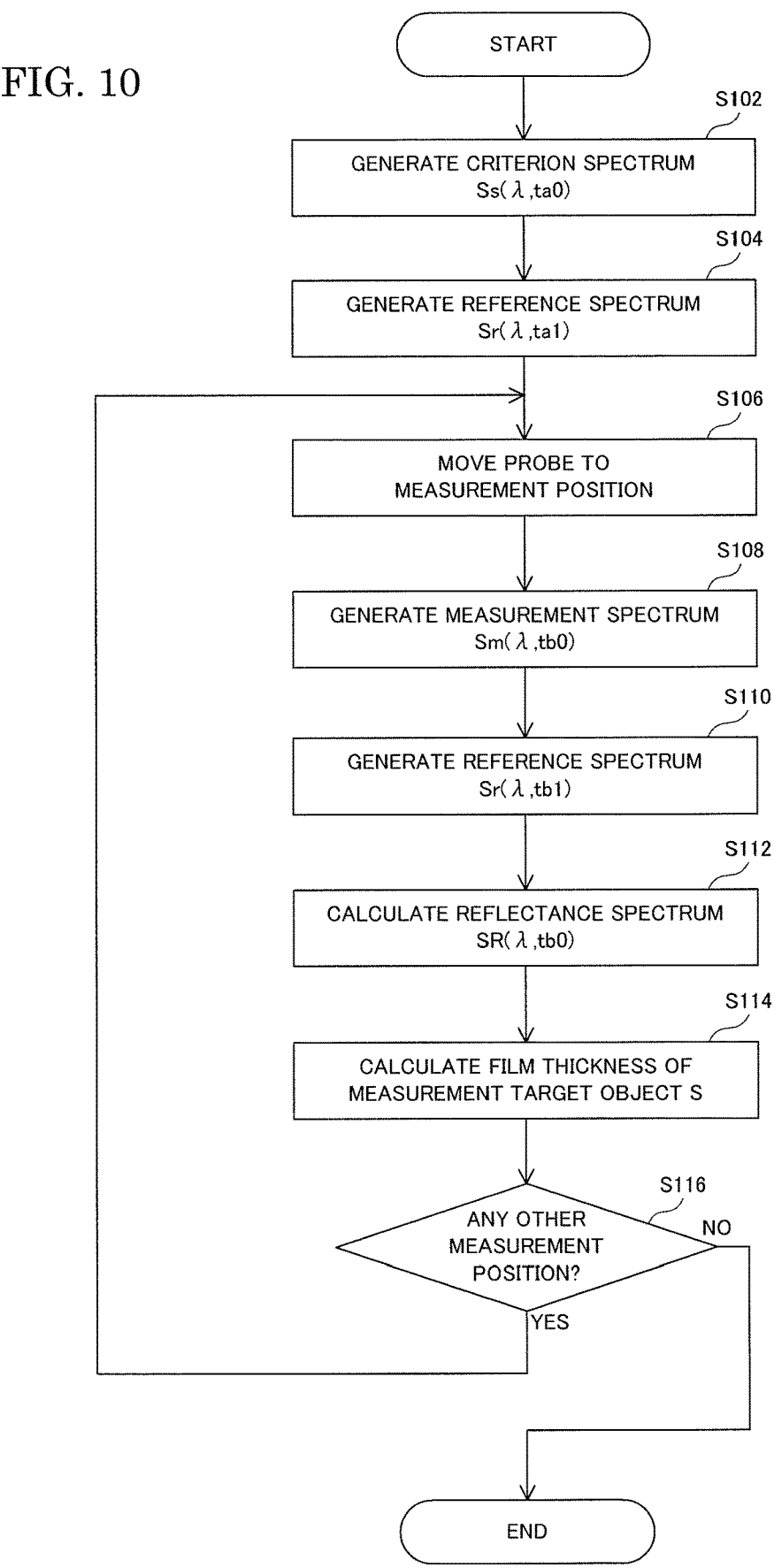
FIG. 10 is a flowchart showing examples of operation procedures for measuring the film thickness of a measurement target object using the film thickness measuring apparatus according to the embodiment of the present invention.

FIG. 10 is a flowchart showing examples of operation procedures for measuring the film thickness of a measurement target object using the film thickness measuring apparatus according to the embodiment of the present invention.

As shown in FIG. 10, first, in a state where the reflection plate R is placed on the sample platform 90, the film thickness measuring apparatus 101 irradiates the reflection plate R with light via the measurement light path 21, guides the reflected light from the reflection plate R to the spectroscope 70, and thus generates the criterion spectrum $Ss(\lambda, ta0)$ (step S102).

Next, the film thickness measuring apparatus 101 irradiates the reference member 50 with light via the correction light path 22, guides the reflected light from the reference member 50 irradiated with light, to the spectroscope 70, and thus generates the reference spectrum $Sr(\lambda, ta1)$ (step S104).

Next, in a state where the measurement target object S is placed on the sample platform 90, the film thickness measuring apparatus 101 moves the probe 10 to a position above a predetermined measurement position on the measurement target object S such as the measurement position X1 according to a user operation (step S106).

Next, the film thickness measuring apparatus 101 irradiates the measurement position X1 on the measurement target object S with light via the measurement light path 21, guides the reflected light from the measurement position X1 on the measurement target object S to the spectroscope 70, and thus generates the measurement spectrum $Sm(\lambda, tb0)$ (step S108).

Next, the film thickness measuring apparatus 101 irradiates the reference member 50 with light via the correction light path 22, guides the reflected light from the reference member 50 irradiated with light, to the spectroscope 70, and thus generates the reference spectrum $Sr(\lambda, tb1)$ (step S110).

Next, the film thickness measuring apparatus 101 calculates the reflectance spectrum $SR(\lambda, tb0)$ of the measurement target object S at the measurement position X1, using the criterion spectrum $Ss(\lambda, ta0)$, the reference spectrum $Sr(\lambda, ta1)$, the measurement spectrum $Sm(\lambda, tb0)$, and the reference spectrum $Sr(\lambda, tb1)$ (step S112).

Next, the film thickness measuring apparatus 101 calculates the film thickness of the measurement target object S at the measurement position X1 based on the reflectance spectrum $SR(\lambda, tb0)$ thus calculated (step S114).

Next, if there is another measurement position of the measurement target object S at which measurement is to be performed (YES in step S116), the film thickness measuring apparatus 101 moves the probe 10 to a position above the predetermined measurement position on the measurement target object S such as the measurement position X2 according to a user operation, and emits light to the measurement position X2 on the measurement target object S via the measurement light path 21 to calculate the film thickness of the measurement target object S at the measurement position X2 (steps S106 to S114).

Note that the order in which the above steps S102 and S104 are carried out is not limited to the above-described order, and may be changed. Also, the order in which the above steps S108 and S110 are carried out is not limited to the above-described order, and may be changed.

When the film thickness measuring apparatus 100 is used instead of the film thickness measuring apparatus 101, steps S106 and S116 are not carried out.

Modifications

Although the film thickness measuring apparatuses 100 and 101 according to the embodiments of the present invention have been described as including the light source 60, the spectroscope 70, and the processing device 80, the film thickness measuring apparatuses 100 and 101 are not limited to such a configuration. The film thickness measuring apparatuses 100 and 101 may be configured such that at least one of the light source 60, the spectroscope 70, and the processing device 80 is not provided therein, and is provided outside the film thickness measuring apparatuses 100 and 101.

Although the film thickness measuring apparatus 101 according to an embodiment of the present invention has been described as including the light emitting fiber 11 and the light receiving fiber 12, the film thickness measuring apparatus 101 is not limited to such a configuration. The film thickness measuring apparatus 101 may be configured so as not to include at least one of the light emitting fiber 11 and the light receiving fiber 12. If this is the case, for example, at least one of the light source 60 and the spectroscope 70 is provided inside the probe 10.

Although the light switching unit 30 in the film thickness measuring apparatus 100 according to an embodiment of the present invention has been described as including the shutter 31 and the shutter controller 32, the light switching unit 30 is not limited to such a configuration. For example, the light switching unit 30 may include, instead of the shutter 31 and the shutter controller 32, a movable mirror and a movable mirror controller that controls the position at which the movable mirror is placed. Alternatively, the light switching unit 30 may include an optical switch instead of the shutter 31 and the shutter controller 32. Note that, if the light switching unit 30 includes an optical switch, the film thickness measuring apparatus 100 may be configured so as not to include the beam splitter 40.

Although the film thickness measuring apparatus 100 according to an embodiment of the present invention has been described as being configured such that light reflected from the beam splitter 40 travels to the target object P placed on the sample platform 90, and light passing through the beam splitter 40 travels to the reference member 50, the film thickness measuring apparatus 100 is not limited to such a configuration. The film thickness measuring apparatus 100 may be configured such that light reflected from the beam splitter 40 travels to the reference member 50 and light passing through the beam splitter 40 travels to the target object P placed on the sample platform 90.

Also, although the film thickness measuring apparatus 100 according to an embodiment of the present invention has been described as including the condensing lens 41, the film thickness measuring apparatus 100 is not limited to such a configuration.

Figure 11:
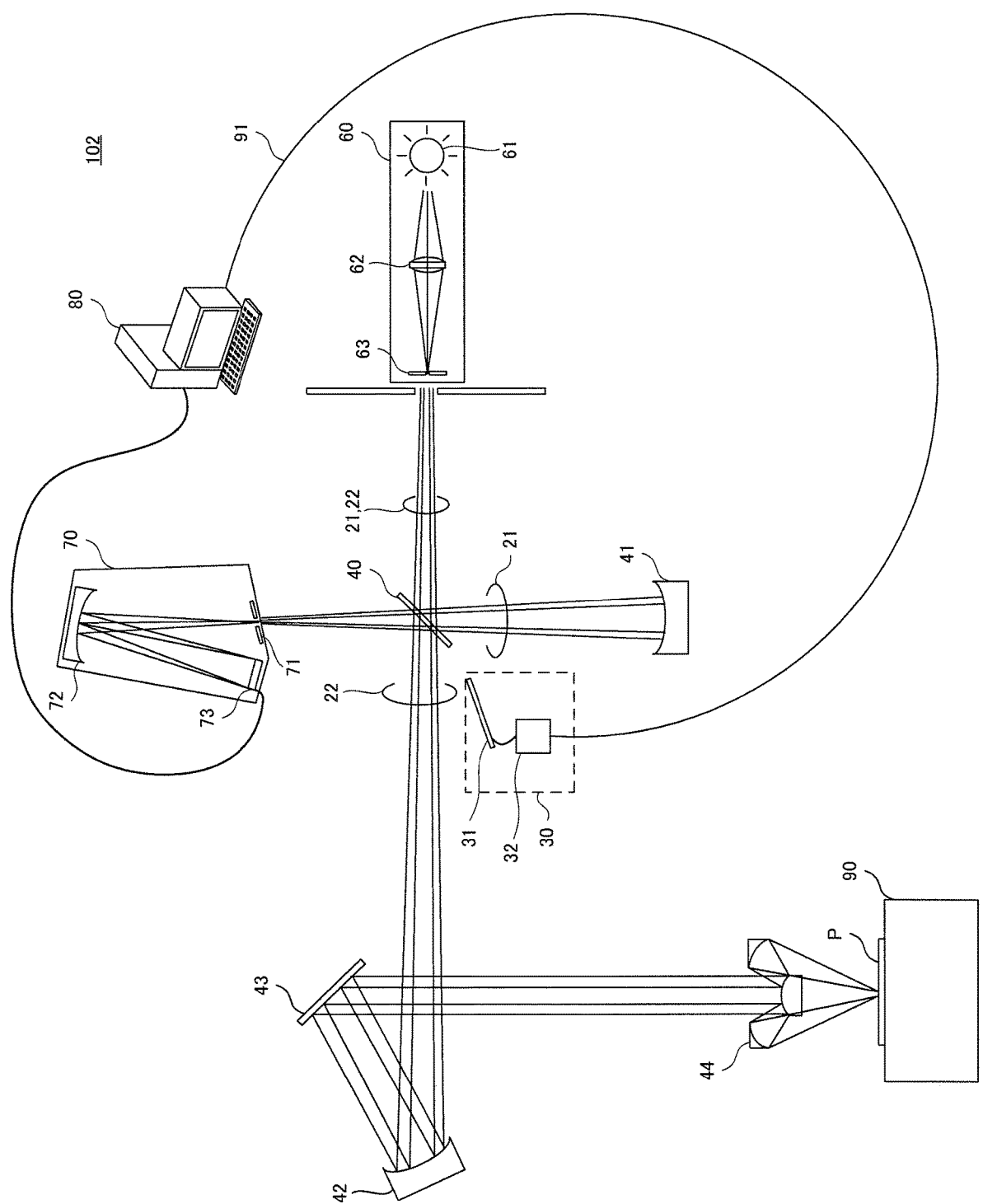
FIG. 11 is a diagram showing a configuration of a modification of the film thickness measuring apparatus according to the embodiment of the present invention.

FIG. 11 is a diagram showing a configuration of a modification of the film thickness measuring apparatus according to the embodiment of the present invention.

As shown in FIG. 11, a film thickness measuring apparatus 102 includes a concave mirror 42, a mirror 43, and a reflective objective lens 44, instead of the condensing lens 41 of the film thickness measuring apparatus 100.

The concave mirror 42 reflects the light passing through the beam splitter 40. The mirror 43 reflects the light reflected by the concave mirror 42, toward the reflective objective lens 44. The reflective objective lens 44 condenses the light reflected by the mirror 43, and irradiates the target object P placed on the sample platform 90 with the condensed light.

The measurement light path 21 in the film thickness measuring apparatus 102 includes a light path from the light source 60 to the beam splitter 40, a light path from the beam splitter 40 to the concave mirror 42, a light path from the concave mirror 42 to the mirror 43, and a light path from the mirror 43 to the reflective objective lens 44.

The reflected light from the target object P enters the spectroscope 70 via the reflective objective lens 44, the mirror 43, the concave mirror 42, and the beam splitter 40.

The foregoing embodiments are to be construed in all respects as illustrative and not restrictive. The scope of the present invention is defined by the claims rather than the description above, and is intended to include all modifications within the meaning and scope of the claims and equivalents thereof.

What is claimed is:

1. A film thickness measuring apparatus comprising:
a measurement light path for irradiating a measurement target object with light from a light source;
a correction light path for irradiating a reference member with light from the light source;
a light switching unit that selectively guides reflected light from the measurement target object or reflected light from the reference member, to a spectroscope; and
a processor configured to
generate a spectrum of reflected light from the measurement target object by selectively guiding reflected light from the measurement target object irradiated with light that travels to the measurement target object via the measurement light path, to a spectroscope;
generate a spectrum of reflected light from the reference member by selectively guiding reflected light from the reference member irradiated with light that travels to the reference member via the correction light path, to the spectroscope; and
calculate a thickness of the measurement target object based on the spectrum of the reflected light from the measurement target object and the spectrum of the reflected light from the reference member, wherein
the generating the spectrum of reflected light from the reference member is regularly or irregularly repeated,
in the generating the spectrum of reflected light from the reference member, a first reference spectrum that is the spectrum of reflected light from the reference member is generated, and
in the calculating the thickness of the measurement target object, a reflectance spectrum of the measurement target object is calculated by dividing the spectrum of reflected light from the measurement target object by the first reference spectrum generated immediately before or immediately after the generation of the spectrum of reflected light from the measurement target object, and the thickness of the measurement target object is calculated based on the reflectance spectrum thus calculated.

2. The film thickness measuring apparatus according to claim 1, wherein
the measurement light path, the correction light path, and the light switching unit are provided in a housing, and
the film thickness measuring apparatus further comprises at least one of a light emitting fiber that guides light from the light source provided outside the housing, to the housing, and a light receiving fiber that guides reflected light guided by the light switching unit, which is reflected light from the measurement target object or reflected light from the reference member, to the spectroscope provided outside the housing.

3. A film thickness measuring method that is carried out by using a film thickness measuring apparatus that includes a measurement light path for irradiating a measurement target object with light from a light source, and a correction light path for irradiating a reference member with light from the light source, the film thickness measuring method comprising:
 a step of generating a spectrum of reflected light from the measurement target object by selectively guiding reflected light from the measurement target object irradiated with light that travels to the measurement target object via the measurement light path, to a spectroscope;
 a step of generating a spectrum of reflected light from the reference member by selectively guiding reflected light from the reference member irradiated with light that travels to the reference member via the correction light path, to the spectroscope; and
 a step of calculating a thickness of the measurement target object based on the spectrum of the reflected light from the measurement target object and the spectrum of the reflected light from the reference member, wherein
 the step of generating the spectrum of reflected light from the reference member is regularly or irregularly repeated,
 in the step of generating the spectrum of reflected light from the reference member, a first reference spectrum that is the spectrum of reflected light from the reference member is generated, and
 in the step of calculating the thickness of the measurement target object, a reflectance spectrum of the measurement target object is calculated by dividing the spectrum of reflected light from the measurement target object by the first reference spectrum generated immediately before or immediately after the generation of the spectrum of reflected light from the measurement target object, and the thickness of the measurement target object is calculated based on the reflectance spectrum thus calculated.

4. A film thickness measuring method that is carried out by using a film thickness measuring apparatus that includes a measurement light path for irradiating a measurement target object with light from a light source, and a correction light path for irradiating a reference member with light from the light source, the film thickness measuring method comprising:
 a step of generating a spectrum of reflected light from the measurement target object by selectively guiding reflected light from the measurement target object irradiated with light that travels to the measurement target object via the measurement light path, to a spectroscope;
 a step of generating a spectrum of reflected light from the reference member by selectively guiding reflected light from the reference member irradiated with light that travels to the reference member via the correction light path, to the spectroscope; and
 a step of calculating a thickness of the measurement target object based on the spectrum of the reflected light from the measurement target object and the spectrum of the reflected light from the reference member, wherein
 the step of generating the spectrum of reflected light from the reference member is regularly or irregularly repeated,
 in the step of generating the spectrum of reflected light from the reference member, a first reference spectrum that is the spectrum of reflected light from the reference member is generated, and
 the film thickness measuring method further comprises
  a step in which, in a state where a reflection plate is placed on a sample platform, a spectrum of reflected light from the reflection plate is generated by selectively guiding reflected light from the reflection plate irradiated with light that travels to the reflection plate via the measurement light path, to a spectroscope, and a second reference spectrum that is the spectrum of reflected light from the reference member is generated by selectively guiding reflected light from the reference member irradiated with light that travels to the reference member via the correction light path, to the spectroscope, and
  in the step of calculating the thickness of the measurement target object, a virtual criterion spectrum is calculated by dividing a product of the spectrum of reflected light from the reflection plate and the first reference spectrum generated immediately before or immediately after the generation of the spectrum of reflected light from the measurement target object by the second reference spectrum, a reflectance spectrum of the measurement target object is calculated by dividing the spectrum of reflected light from the measurement target object by the virtual criterion spectrum, and the thickness of the measurement target object is calculated based on the reflectance spectrum thus calculated.

5. The film thickness measuring method according to claim 3, wherein
 the measurement light path and the correction light path are provided in a housing,
 at least one of the spectroscope and the light source is provided outside the housing, and
 the film thickness measuring method comprises:
  a step that includes the step of generating the spectrum of reflected light from the measurement target object and the step of generating the spectrum of a reflected light from the reference member, and that is a step of calculating the thickness of the measurement target object at a first measurement position by irradiating the first measurement position on the measurement target object with light; and
  a step that includes the step of generating the spectrum of reflected light from the measurement target object and the step of generating the spectrum of a reflected light from the reference member, and that is a step of calculating the thickness of the measurement target object at a second measurement position that is different from the first measurement position on the measurement target object by irradiating the second measurement position on the measurement target object with light.

6. A film thickness measuring apparatus comprising:
 a measurement light path for irradiating a measurement target object with light from a light source;
 a correction light path for irradiating a reference member with light from the light source;
 a light switching unit that selectively guides reflected light from the measurement target object or reflected light from the reference member, to a spectroscope; and a processor configured to
  generate a spectrum of reflected light from the measurement target object by selectively guiding reflected light from the measurement target object irradiated with light that travels to the measurement target object via the measurement light path, to a spectroscope;
  generate a spectrum of reflected light from the reference member by selectively guiding reflected light from the reference member irradiated with light that travels to the reference member via the correction light path, to the spectroscope; and
  calculate a thickness of the measurement target object based on the spectrum of the reflected light from the measurement target object and the spectrum of the reflected light from the reference member, wherein
the generating the spectrum of reflected light from the reference member is regularly or irregularly repeated,
in the generating the spectrum of reflected light from the reference member, a first reference spectrum that is the spectrum of reflected light from the reference member is generated, and
the processor is further configured to execute
  a step in which, in a state where a reflection plate is placed on a sample platform, a spectrum of reflected light from the reflection plate is generated by selectively guiding reflected light from the reflection plate irradiated with light that travels to the reflection plate via the measurement light path, to a spectroscope, and a second reference spectrum that is the spectrum of reflected light from the reference member is generated by selectively guiding reflected light from the reference member irradiated with light that travels to the reference member via the correction light path, to the spectroscope, and
  in the calculating the thickness of the measurement target object, calculating a virtual criterion spectrum by dividing a product of the spectrum of reflected light from the reflection plate and the first reference spectrum generated immediately before or immediately after the generation of the spectrum of reflected light from the measurement target object by the second reference spectrum, a reflectance spectrum of the measurement target object is calculated by dividing the spectrum of reflected light from the measurement target object by the virtual criterion spectrum, and the thickness of the measurement target object is calculated based on the reflectance spectrum thus calculated.

* * * * *